Nov. 18, 1969  P. W. SANDROCK  3,479,272
APPARATUS FOR PLATING, BLACKENING, PICKLING, STRIPPING
AND THE LIKE
Filed Aug. 9, 1966  3 Sheets-Sheet 1

INVENTOR.
PAUL W. SANDROCK
BY Bosworth, Sessions,
Herrstrom & Knowles
ATTORNEYS

INVENTOR.
PAUL W. SANDROCK
ATTORNEYS.

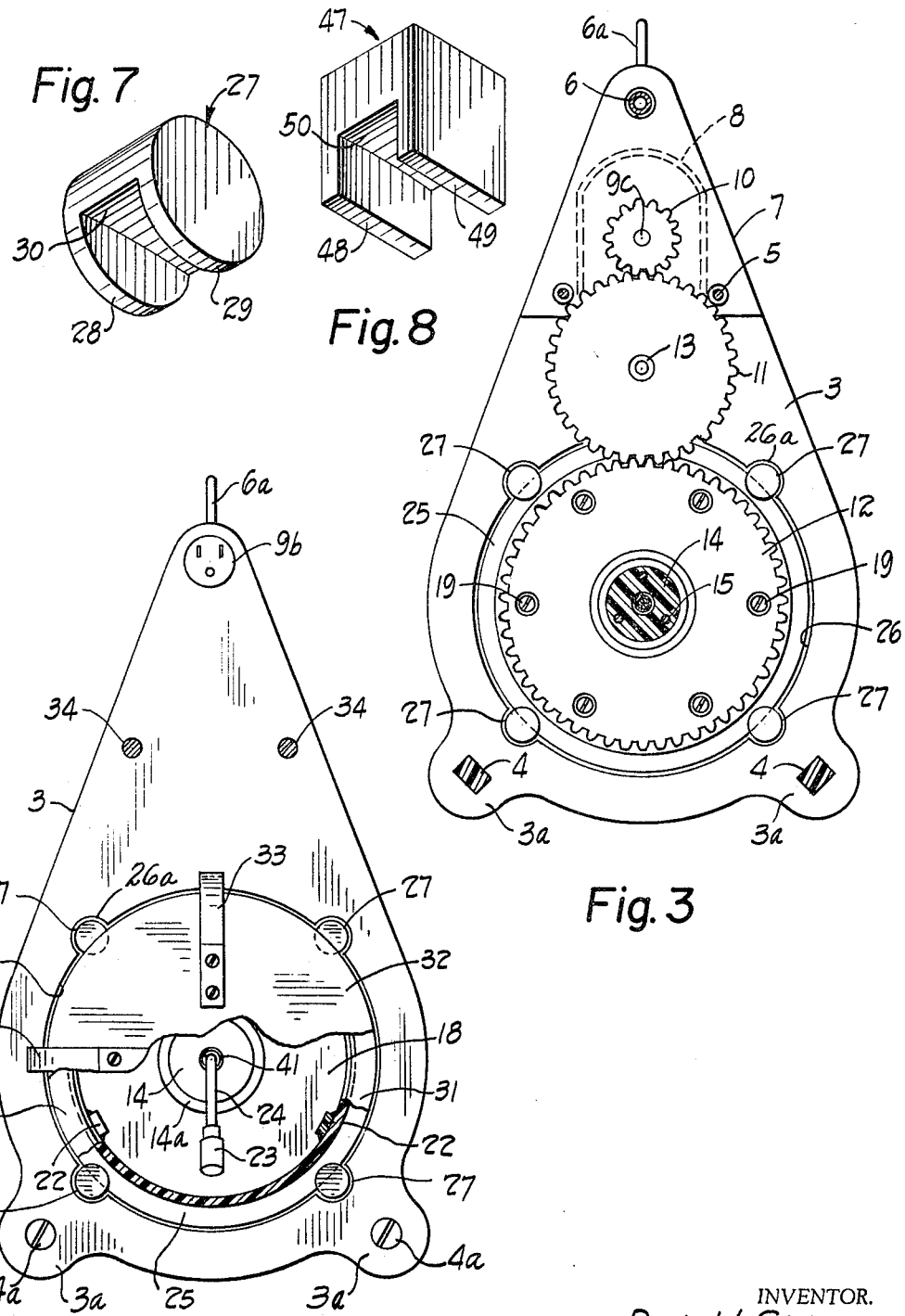

— 3,479,272
APPARATUS FOR PLATING, BLACKENING, PICKLING, STRIPPING AND THE LIKE
Paul W. Sandrock, Cleveland, Ohio
(4668 Windfall Road, Medina, Ohio 44256)
Filed Aug. 9, 1966, Ser. No. 571,248
Int. Cl. C23b 5/78
U.S. Cl. 204—213                3 Claims

ABSTRACT OF THE DISCLOSURE

Apparatus for use in plating comprised of two substantially parallel sidepieces of the nature of panels, a prime mover and power train supported therefrom, a drum the axis of which extends transversely thereto, a circular opening in one of said sidepieces through which the drum projects, cut-away areas adjoining said circular opening, and synthetic resin bearings in said cut-away areas with internally located bearing surfaces for engagement by peripheral parts of the drum.

---

This invention relates to processing apparatus of the type incorporating a synthetic resin drum for the performance therein of such operations as plating, blackening, pickling, stripping and like, hereinafter collectively referred to as "plating."

The use of synthetic resin drums for plating units is described in such prior patents as U.S. Patent 2,886,505 to Singleton et al., granted May 12, 1959 for "Plating Apparatus." Often these drums are of hexagonal cross-section, particularly if designed for use in heavy-duty equipment, but drums of cylindrical shape are described, for example, in U.S. Patent 2,562,084 to Collick, granted July 24, 1951 for "Article Treating and Plating Apparatus." Because of the severe conditions to which such drums are subjected, often including not only acid environments but elevated temperatures, troublesome work pieces and heavy loads, their useful lives are often short, necessitating frequent replacement even in heavy-duty equipment.

The present invention has for its principal object to eliminate, or at least alleviate, these drawbacks in portable units of kinds that may be up-ended for loading or unloading by angling the unit as a whole about an appropriate part of the base. A further and more specific object is to provide plating apparatus of this kind in which, by rotatably supporting the drum on a plurality of peripherally spaced bearings, the total load on the bearings may be divided among them with attendant distribution and dissemination of the stresses to which the bearings, drum and supporting structure are subjected.

Other objects, advantages and features of the invention will be apparent from the description which follows and from the accompanying drawings.

Figure 1:
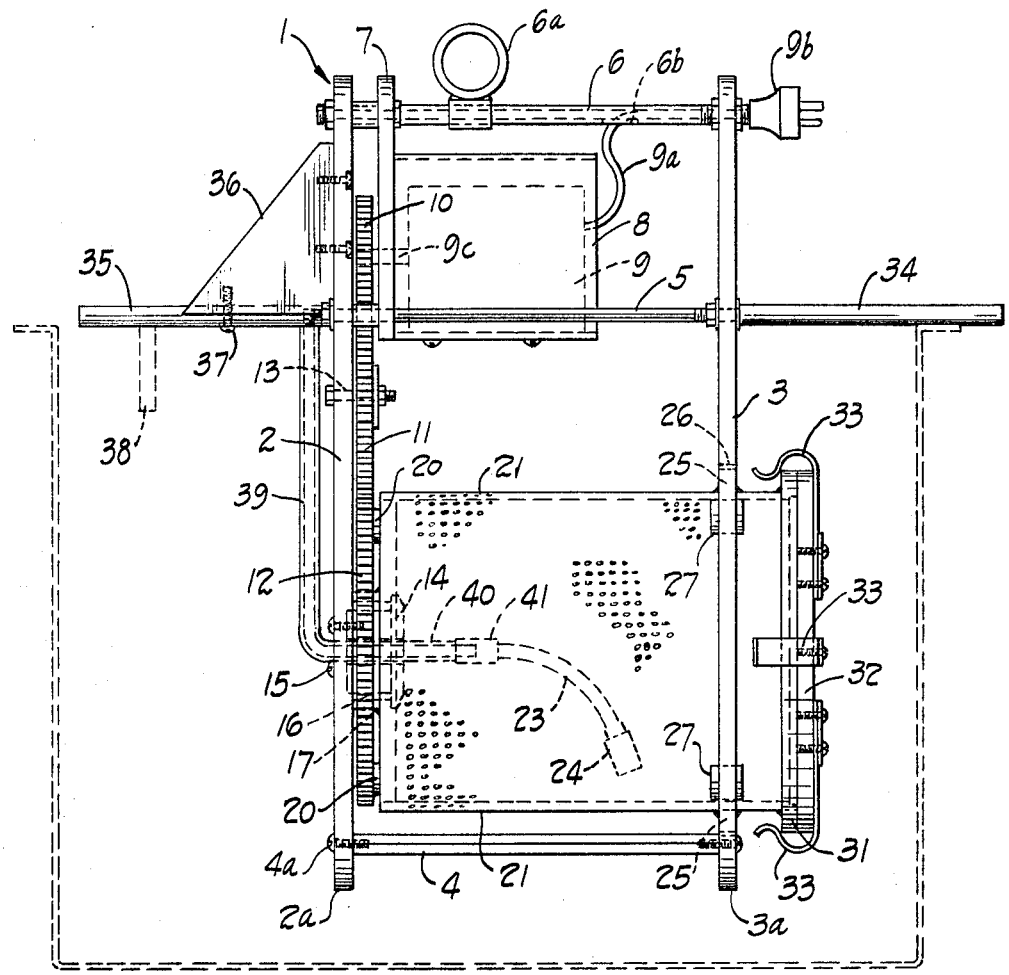
Figure 2:
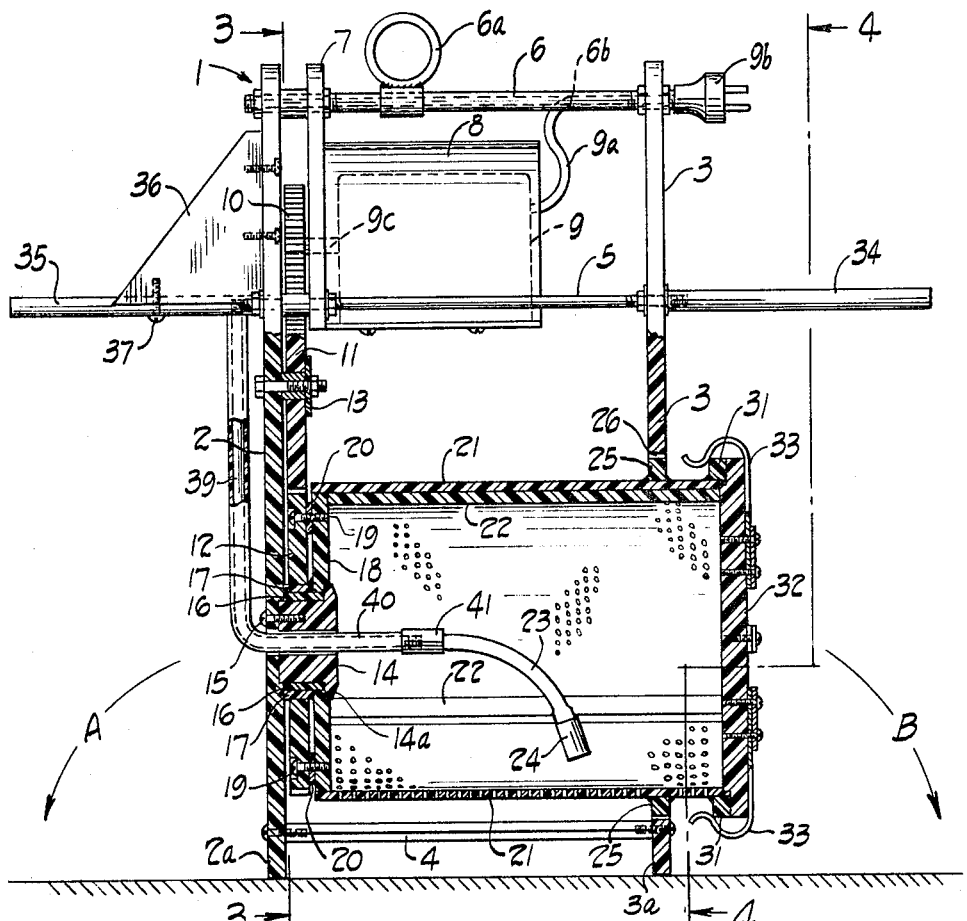
Figure 5:
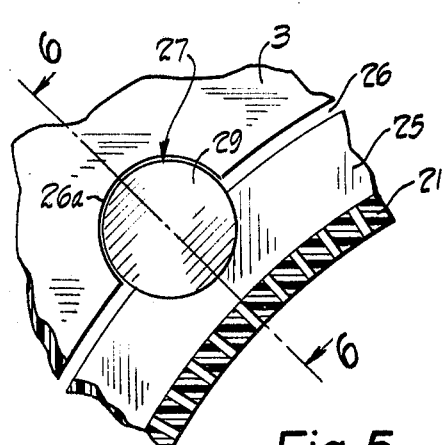
Figure 6:
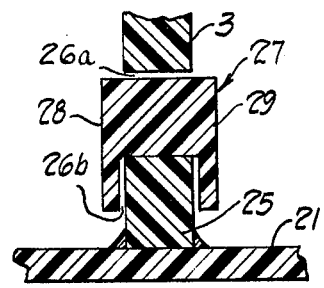

In such drawings, FIGURE 1 is a side elevation, on a reduced scale, of a portable plating unit conforming to the teachings of the invention. FIGURE 2, a longitudinal vertical section on the same scale in which certain of the parts are shown in elevation. FIGURE 3 is a view of the nature of an end elevation with certain parts in section, seen as if from line 3—3 of FIGURE 2. FIGURE 4 is a like view, also with parts in section, as seen from line 4—4 of FIGURE 2. FIGURE 5 is a fragmentary view on a larger scale showing one of the peripheral bearings in side elevation. FIGURE 6 is a corresponding section on line 6—6 of FIGURE 5. FIGURES 7 and 8 are isometric showings of bearings.

A portable plating unit 1 of a type designed to be supported within the lateral limits of a conventional plating tank is shown in FIGURES 1 and 2. Among other things, it incorporates two relatively thick sidepieces 2 and 3, preferably of an acid-resistant synthetic resin such, for example, as polypropylene in sheet form. Sidepiece 3 can best be seen in FIGURE 4. The peripheral outline may be taken to represent the peripheral outline of sidepiece 2 as well. Respectively, sidepieces 2 and 3 are provided with feet 2a and 3a; see FIGURES 1 and 2. Polypropylene tie rods 4 of rectangular cross-section intervene between sidepieces 2 and 3, extending from feet 2a on the former to feet 3a on the latter. They are held in place by stainless steel screws 4a.

Extending between sidepieces 2 and 3 near the top of the plating unit is a pair of stainless steel tie rods 5. Above them, taking the form of a stainless steel tube located near the apices of the sidepieces, is another tie rod 6. Rigidly affixed to it is a loop or eye 6a, likewise of stainless steel, by which the entire plating unit may be lifted out of the plating bath. A small triangular mounting plate 7, seen in FIGURES 1, 2, and 3, is incorporated in the supporting structure at its left-hand end, seen as in FIGURE 1.

Plate 7, which is preferably of acid-resistant synthetic resin, supports an acid resistant synthetic resin shield 8 within which is housed an electric motor 9. The latter is supplied with current by means of an electrical cable 9a that enters the supporting structure through the open end of tubular tie rod 6 at the point where connecting plug 9b appears in FIGURES 1 and 2. Cable 9a leaves tubular tie rod 6 through an opening 6b and proceeds thence to motor 9, the shaft of which is indicated at 9c.

Just inwardly of sidepiece 2 is a vertically aligned synthetic resin gear train of which the uppermost gear, driving gear 10, is coupled to and rotates with motor shaft 9c. The middle gear, idler 11, is mounted for rotation on end piece 2 by means of the mounting assembly indicated generally at 13 (FIGURE 2). Driven gear 12, the lowermost gear, is supported coaxially of but out of actual contact with a massive hub 14 of synthetic resin that is affixed, as by screws 15, to end piece 2. A sleeve-like cylindrical bushing 16 surrounds the greater part of hub 14. Gear train 10, 11 and 12 and hub 14 are of acid-resistant synthetic resin, preferably polypropylene; bushing 13, which, like them, is formed of acid-resistant synthetic resin, may advantageously be of a tough, hard resin of a chemically different composition such as nylon or methyl methacrylate.

Intervening between driven gear 12 and bushing 16 is a longitudinally extending polypropylene flange 17 that is formed independently of but fused, welded or otherwise permanently affixed to drum head 18. The latter is affixed, as by assembly 19, to driven gear 12. Spacers 20 separate driven gear 12 and drum head 18. The latter is fused, welded or otherwise affixed to drum barrel 21, which is perforated over virtually its entire surface. Interiorly of the drum are three ribs 22 that extend lengthwise of the drum; these ribs not only reinforce, stiffen and strengthen the drum but keep the workpieces from clinging to it. Each is fused, welded or otherwise affixed to the barrel and serves to reinforce it longitudinally.

The interior of the drum is supplied with electrical current by means of a dangler 23 provided with a terminal 24.

Toward the drum end opposite drum head 18 a radial flange 25 is affixed to barrel 21 as indicated in FIGURES 1 to 4. In this zone, sidepiece 3 is provided with a circular opening 26, seen in FIGURE 4, of a size which is not only sufficient to accept flange 25 but sufficient to leave a generous clearance around it. This prevents binding resulting from contact between flange 25 and end piece 3. Flange 25 is of the same material as the remainer of the drum, preferably polypropylene.

At the end of the plating unit seen at the left in FIGURES 1 and 2, the massive size of hub 14 permits it to accept the maximum load imposed on it by the drum. However, this construction cannot be used at the opposite or outboard end of the drum. Thus in a plating unit that is to be loaded and unloaded at such outboard end, provision must be made for supporting the outboard end of the drum in some other way.

In the present invention, this is accomplished by providing sidepiece 3 with a plurality of floating bearings 27 disposed in a corresponding number of openings 26a of semi-circular shape (FIGURE 5). Such bearings may be thought of as stationary in that they are non-rotatable; however there is limited freedom for lateral movement as indicated at 26b in FIGURE 6. It will be apparent from FIGURE 7 that bearing 27 is of cylindrical block form, made from circular rod, and characterized by circular ends 28 and 29. Between them, at the base of a spool-like recess, is a bearing surface 30 of a radius of curvature considerably greater than that of flange 25.

At the outboard end of the drum is a second circular flange 31 which, like flange 25, is fused, welded or otherwise affixed to barrel 21. Cooperating with it is a circular door 32 portions which bear against the end of barrel 21 and the ends of ribs 22. Stainless steel clamps 33 of conventional construction are used to hold door 32 in place on flange 31. To release door 32, outwardly directed forces are normally applied by the operator's fingers to the clamp ends. During much of the time, door 32 is in position on the drum, being removed only for loading, unloading and cleaning.

Supported from endpiece 3 and tie rods 5 in alignment with the tie rods are two internally threaded handling rods 34 of stainless steel. At the same level but at the opposite end of the plating unit is a single centrally located handling rod 35. All three handles are for use in manipulating the plating unit, as by rotating it clockwise about feet 3a or counterclockwise about feet 2a. Prior to loading the unit, it is angled as indicated by arrow A (FIGURE 2); prior to unloading, it is angled as indicated by arrow B. When in unloading position, the workpieces tend to fall out of the drum by gravitational action, discharging onto the table or bench indicated by the line appearing just below feet 2a and 3a in FIGURE 2.

To support handle 35, which is out of alignment with tie rods 5, a triangular bracket 36 of synthetic resin is mounted on and at right angles to sidepiece 2. The lower edge of bracket 36 is channeled to conform to the curved shape of handle 35. The handle and bracket are held together by screws 37 of the same material as handle 35. The latter may, if desired, serve no other purpose than that of assisting in angling the plating unit as above described; if so, it and screws 37 will normally be of stainless steel.

Conveniently, however, handle 35 may be employed as a conductor for current supplied for plating purposes by bus bar 38 (FIGURE 1), in which case it will normally be of an acid-tolerant copper alloy such as brass and held to bracket 36 by a screw 37 of the same metallurgical composition. If so, the threaded upper end of the vertical leg 39 of an L-shaped conductor 39, 40, likewise of brass but coated by a synthetic resin jacket, may be screwed into a tapped opening in handle 35. Consequently, plating current may flow from bus bar 38 into handle 35, downward through vertical leg 39 into horizontal leg 40, and thence through a coupling 41 into dangler 23.

Thus the invention provides a sturdy, easily manipulable portable plating unit that can be rotated by the operator into loading or unloading position on a workbench by applying relatively light downward pressure on handles 34 and 35. At the same time, the unit is light enough in weight so that even when loaded it can be lifted into and out of the plating tank without undue difficulty. The above-described peripheral bearing system employing cylindrical bearings 27 with circular ends (FIGURE 7) or, if desired, rectangular bearings 47 with square ends 48, 49 and an intervening bearing surface 50 (FIGURE 8) not only provides needed support for the drum near its outboard end but serves to keep bearing drag to an acceptable minimum.

It is intended that the patent shall cover, by summarization in approved claims, all features of patentable novelty residing in the invention.

What is claimed is:

1. Apparatus for use in performing plating, blackening, pickling, stripping and like operations comprising supporting structure including a plurality of generally parallel sidepieces of the nature of panels; a prime mover supported therefrom; a power train; a synthetic resin drum driven thereby of which the major axis extends transversely to said sidepieces; aligned openings in said sidepieces through one of which one end of the drum projects; circumferentially arranged cut-away areas adjoining the periphery of said opening; and, disposed in said cut-away areas, floating synthetic resin bearings with internal bearing surfaces engaging peripherally disposed portions of the drum.

2. Apparatus according to claim 1 wherein the bearings are non-rotatably held in said cut-away areas.

3. Apparatus according to claim 1 wherein the end portions of the bearings overlap the proximate portions of the barrel.

References Cited

UNITED STATES PATENTS

| 861,558 | 7/1907 | Totten | 204—212 |
|---------|--------|--------|---------|
| 1,207,283 | 12/1916 | Enghauser | 204—214 |
| 1,854,763 | 4/1932 | Richards et al. | 204—213 |

FOREIGN PATENTS 1,070,468  12/1959  Germany.

JOHN H. MACK, Primary Examiner

W. B. VANSISE, Assistant Examiner

U.S. Cl. X.R.

118—418; 259—89